US006725643B1

United States Patent
Paul

(10) Patent No.: US 6,725,643 B1
(45) Date of Patent: Apr. 27, 2004

(54) HIGH EFFICIENCY GAS TURBINE POWER GENERATOR SYSTEMS

(76) Inventor: Marius Paul, 1120 E. Elm Ave., Fullerton, CA (US) 92831

( * ) Notice: Subject to any disclaimer, the term of this patent is extended or adjusted under 35 U.S.C. 154(b) by 0 days.

(21) Appl. No.: 10/175,487

(22) Filed: Jun. 19, 2002

Related U.S. Application Data

(63) Continuation-in-part of application No. 10/141,026, filed on May 8, 2002.
(60) Provisional application No. 60/299,395, filed on Jun. 19, 2001.

(51) Int. Cl.[7] ................................................. F02C 3/10
(52) U.S. Cl. ................................................... 60/39.162
(58) Field of Search .......................... 60/788, 791, 792, 60/39.162, 39.15, 39.511

(56) References Cited

U.S. PATENT DOCUMENTS

| 2,322,987 | A | * | 6/1943 | West | 60/39.511 |
| 2,390,959 | A | * | 12/1945 | Pfenninger | 60/788 |
| 3,765,169 | A | * | 10/1973 | Kyrklund | 60/792 |
| 4,843,813 | A | * | 7/1989 | Paul | 60/39.162 |
| 5,119,624 | A | * | 6/1992 | McKenna | 60/39.15 |
| 6,282,897 | B1 | | 9/2001 | Paul | |
| 6,418,707 | B1 | * | 7/2002 | Paul | 60/39.15 |
| 6,460,324 | B1 | * | 10/2002 | Rakhmailov | 60/39.162 |

* cited by examiner

Primary Examiner—Michael Koczo
(74) Attorney, Agent, or Firm—Richard Esty Peterson

(57) ABSTRACT

A gas turbine power generator with ultra high efficiency, the generator being an assembly of electric motor-generator machines and turbine configurations used in combination with combustor systems for operation of select integrated turbine configurations.

11 Claims, 17 Drawing Sheets

HIGH EFFICIENCY GAS TURBINE POWER GENERATOR SYSTEMS

This application claims the benefit of provisional application Serial No. 60/299,395, filed Jun. 19, 2001, entitled, "High Efficiency Gas Turbine Power Generator," and is a continuation-in-part of application Ser. No. 10/141,026 filed May 8, 2002.

BACKGROUND OF THE INVENTION

This invention relates to a new gas turbine power generator with ultra high efficiency.

Actual gas turbine power generator systems, working on simple Brayton cycle, have a limited thermal efficiency near 30%, low power density and degraded thermal efficiency at part loads. This low level of efficiency and power density is the result of low pressure ratio, reduced turbine inlet temperature and a very high air-fuel ratio. Degraded efficiency at part loads is a result of lower pressure ratios associated with reduced power and a lower turbine inlet temperature.

Additionally, typical gas turbines combustion is associated with high level of NOX emission. The result of all these associated, undesirable characteristics is the limited use of gas turbines for power generation leaving the use of gas turbines only for-Peak Shave-power generation and limited time operation (2–3 hours from 24) resulting in high investment for very low income. Typical gas turbines are using a waste-gate system for controlling the overloads. This novel invention eliminates these disadvantages by select integrated turbine configurations that improve the efficiency of power generation for different power demands.

SUMMARY OF THE INVENTION

A first characteristic of the new gas turbine power generator is the capability to work at very high pressure ratios of 60–100, which produces thermal efficiencies in the range of 70–80%, eliminating the complexity and ultra high cost of combined cycles in conventional multiple-stage, external co-generation systems.

A second characteristic of the new gas turbine power generator is the capability to operate at a constant pressure ratio in all the practical ranges of operation, from full load to part loads, resulting in a constant maximum thermal efficiency and in a constant optimum minimum flat specific fuel consumption, using new arrangements of counter rotating gas turbine and counter rotating compressor assemblies, and integrated turbine configurations.

A third characteristic of the new gas turbine power generator is the capability to work at variable mass flow, from full capacity to low mass flow with constant pressure ratio, using the counter rotating compressor and counter rotating turbine, or the cascade of power generation using integrated turbine configurations.

A fourth characteristic of the new gas turbine power generator is the implementation of a preferred high frequency pulsatory combustion, eliminating the compact combustion flame, by including in select configurations multiple air and steam infusions for reduction of local high temperature concentrations.

A fifth characteristic of the new gas turbine power generator in select systems is the combined steam generation and combustion chamber for internal steam co-generation and low compression work.

A sixth characteristic of the new gas turbine power generator in select systems is the use of new electrical motor generator machines based on this concept and the implementation of an intake side-driving shaft, eliminating the necessity for high pressure sealing systems.

A seventh characteristic of the new gas turbine power generator is the elimination of the waste-gate system.

An eighth characteristic of the new gas turbine power generator in select systems is to have all the compressors and turbines attached in total axial balance, with zero axial loads, forming groups of modules for turbo compressors-turbines, compressors-compressors and turbines-turbines.

A ninth characteristic of the new gas turbine power generator in select systems is a combination of multiple integrated gas turbines for a cascade of power generation.

A tenth characteristic is the preferred inclusion of air assisted foil bearings for minimizing system losses.

DETAILED DESCRIPTION OF THE PREFERRED EMBODIMENTS

Figure 1:
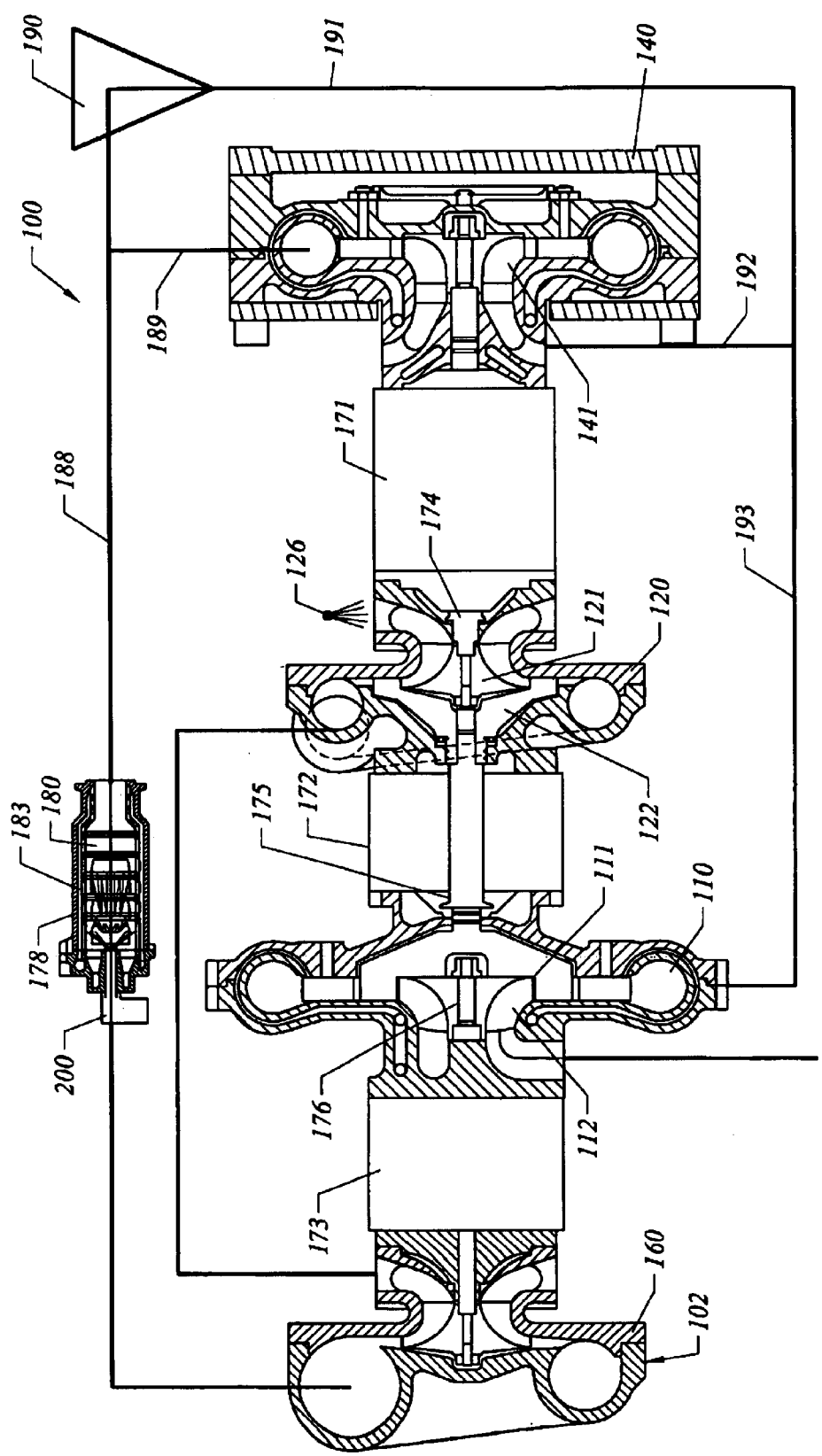
FIG. 1 is a schematic view of the ultra high efficiency gas turbine power generation system.

The general concept and arrangement of the new ultra high efficiency gas turbine power generator is identified with the generic number 100 in FIG. 1. The gas turbine power generator 100 has in a main assembly 102: a counter rotating gas turbine 110 and a counter rotating compressor 120 in combination and described in detail in FIG. 2; an ultra high pressure variable geometry gas turbine 140, described in detail in FIG. 3; an electric motor driven compressor 160 described in detail in FIG. 4; and, an ultra high pressure combustor 178, described in detail in FIG. 5. A series of electric motor-generator machines 171, 172 and 173 are integrated in the assembly 102 by the associated three shafts 174, 175 and 176.

Operation of the ultra high efficiency gas turbine power generator 100 is started by the action of the electric motor 171, driving the central compressor rotor 121, and by the action of the electric motor 172, driving the counter rotating compressor rotor 122 of the counter rotating compressor 120.

The terms "counter rotating compressor" and "counter rotating turbine," as used herein describe a compressor or turbine having a central rotor and a peripheral rotor around the central rotor that rotates in an opposite direction from the rotation of the central rotor.

The first stage compressed air, at a pressure ratio of 1–16–25, is delivered to the electric compressor 160, activated by the electric motor 173, with a pressure ratio of 4/1, resulting in a final ultra high pressure ratio of 40–64–100. Contemporaneously with compressed air delivery, a very fine water spray 126 is injected into the intake of the counter rotating compressor 120 for controlling the compression temperature, and for reducing the compression work. The ultra high pressure wet air is conducted into the ultra high pressure combustion chamber 180 of the combustor 178. Fuel is injected into the high pressure combustion chamber 180 in multiple pulsatory fuel jets and steam is internally cogenerated in the high pressure water/steam jacket 183.

The combusted gases and the internally cogenerated steam are conducted to the ultra high pressure variable geometry gas turbine 140 and partially to the counter rotating gas turbine 110 by passing some gas-steam through the variable geometry valve 190 and the pipe 191 where the gas-steam is associated with the exhaust gases 192 from the gas turbine and conducted to the counter rotating gas turbine 110 through pipe 193.

The central turbine rotor 141 drives the central rotor 121 of the compressor 120 and the electric motor-generator machine 171 that creates the original mass flow and preliminary pressure. The expanded gases from the high pressure variable geometry gas turbine 140 are associated and mixed with the by-pass gases from the combustion chamber 180, and are conducted through the variable geometry counter rotating gas turbine 110, having a central turbine rotor 112 and a counter rotating turbine rotor 111. The mixed gases first drive the counter rotating rotor 111 of the counter rotating turbine 110 which is driving, the counter rotating rotor 122 of the counter rotating compressor 120, delivering the first stage compressed air pressure, 10–16–25. The central rotor 112 of the gas turbine 110 is driving the electric motor driven compressor 160 and the electric generator 173 delivering the final ultra high air pressure, 40–64–100 bar.

An essential and specific feature of the ultra high efficiency gas turbine generator 100 is the capability to operate at variable loads and variable mass flow, conserving the total maximum pressure ratio, resulting in a constant efficiency and constant flat specific fuel consumption. The power density of the ultra high efficiency gas turbines is also maximum because all the compressed air can be used for combustion at stoichiometric level 15/1, instead of 60/1 in actual conventional gas turbines by dilution of combustion gases from the internal steam co-generation, which provides control of the turbine inlet temperature at any level. The result is at least 4 times more power than the same turbine using excess air to dilute the combusted gases.

By regulating the gas flow in the variable geometry ultra high pressure gas turbine 140 using the variable by-pass valve 190, the power and the rotation of this turbine can be controlled to supply a desired original mass flow, and at the intermediate pressure, the by-passed gases and exhaust gases from the gas turbine 140 are driving the counter rotating turbine 110, which in turn is controlling the final constant compression pressure, at any and all mass flow. The electric motor-generator machines 171, 172 and 173 are working at the start-up as motors to initially drive the compressors and, after start-up, as electric generators, absorbing the available supplementary power in excess of the compressors power.

Figure 2:
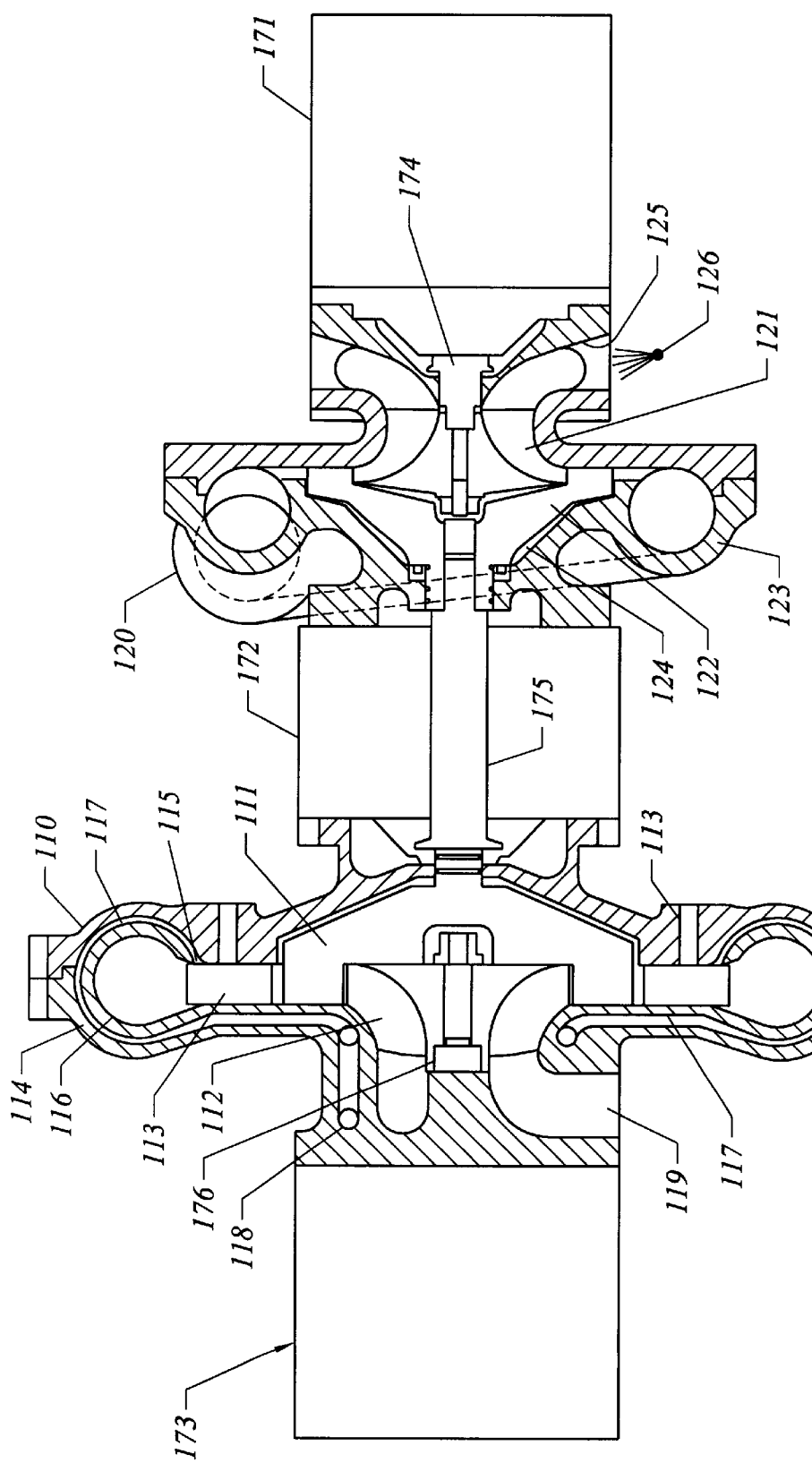
FIG. 2 is a detailed schematic of the counter rotating variable geometry gas turbine and counter rotating high pressure compressor in combination with integrated motor-generator electric machine.

In FIG. 2 the arrangement of the counter rotating assembly of the variable geometry counter rotating gas turbine 110 and the counter rotating compressor 120 are depicted in greater detail. The variable geometry gas turbine 110 has a central turbine rotor 112 and a counter rotating rotor 111 provided with variable vanes 113 surrounding the central turbine rotor 112. The variable geometry vanes 113, regulate the effective area for the flow and direction of the gases driving the peripheral rotor 111 of the turbine 110, which is driving the peripheral rotor 122 of the counter rotating compressor 120 and the electric machine 172 by the common shaft 175. The central turbine rotor 112 is driving the electric machine 173 and motor driven electric compressor 160 by the common shaft 176. The counter rotating compressor 120 is provided with the central rotor 121, which is controlling the mass flow and the preliminary pressure and is driven by the rotor 141 of the ultra high pressure variable geometry turbine 140 by the common shaft 176. The electric motor-generator machine 171, working as an electric generator will extract excess power produced by the ultra high pressure turbine 140.

The gas turbine 110 is provided with a split external housing 114 and an internal housing 116. The gap 117 between the housing 114 and 116 forms a water/steam jacket which creates an internal steam co-generation and a cooling energy recovery when injected water is transformed to steam adding more working fluid to the original gas steam flow. The water is injected through the ring passage 118 and the generated steam enters the motive gas flow through annular gap 115. The combined exhaust gases are ejected through the exit port 119. As noted, the electric machines 171, 172 and 173 are working as motors at the start, and as generators during normal operation, supplying the power grid the excess of generated power over the power used by the compressor.

Figure 3:
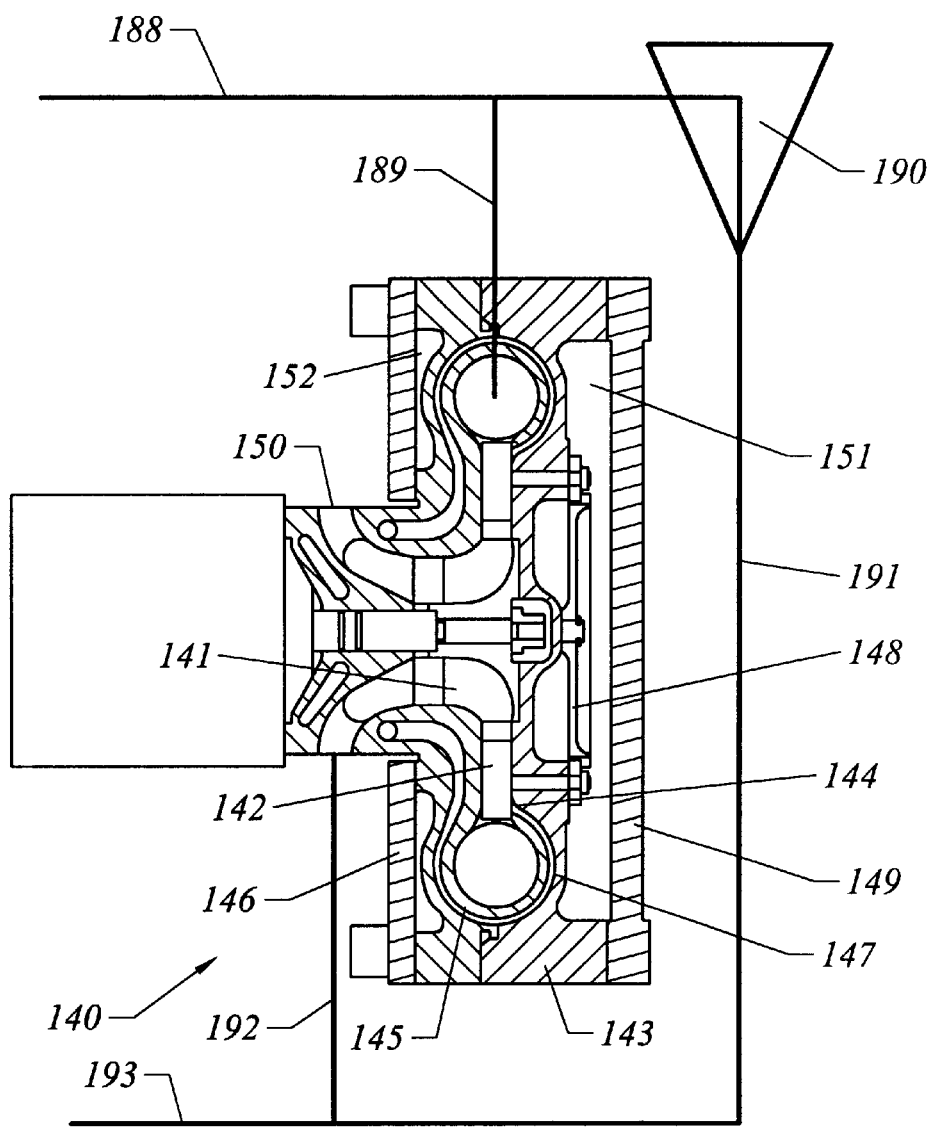
FIG. 3 is a detailed schematic of the ultra high pressure variable geometry gas turbine generator.

In FIG. 3 the ultra high pressure variable geometry, one-stage gas turbine 140 is depicted. The high pressure gas turbine 140 is provided with the central turbine rotor 141, the variable geometry vanes 142, a split external housing 143 with an inner housing 145. Between the external housing 143 and the internal housing 145 is an internal gap 147 in which is injected high pressure water. The water is converted in a process of internal co-generation into high pressure steam, which is injected into the gas stream through annular gap 144 and functions as an additional working fluid while recovering all the cooling energy. Outside jacket plates 146 and 149 close both sides of the external turbine housing and form plenums 151 and 152 into which compressed air having the same pressure as the combustion gases is introduced to balance and eliminate any stress of the external turbine housing 143. The final result of this arrangement is a total elimination of the mechanical and thermal stresses in the turbine housing enabling a light weight turbine to operate at ultra high pressure.

The combustion and steam gases delivered by the combustion chamber 180 of the high pressure combustor 178 through the transfer pipe 188 are diverted to the high pressure turbine 140 through the pipe 189 and to the variable geometry by-pass valve 190. Motive gases diverted through the variable geometry by-pass valve pass through the pipe 191, combine with the gases from the turbine exhaust pipe 192, and are conducted to the counter rotating turbine 110 through the transfer pipe 193. The by-pass ratio will control the power produced by the ultra high pressure turbine 140, the rotation of the turbine 141, and the rotation of the central compressor rotor 121. The rotation of the central compressor rotor in turn controls the mass flow and the preliminary pressure ratio of the counter rotating compressor 120. The high pressure by-passed gases and the exhaust gases drive the counter rotating turbine 110 at the proper level to maintain the constant pressure of the compressor at prescribed level.

Figure 4:
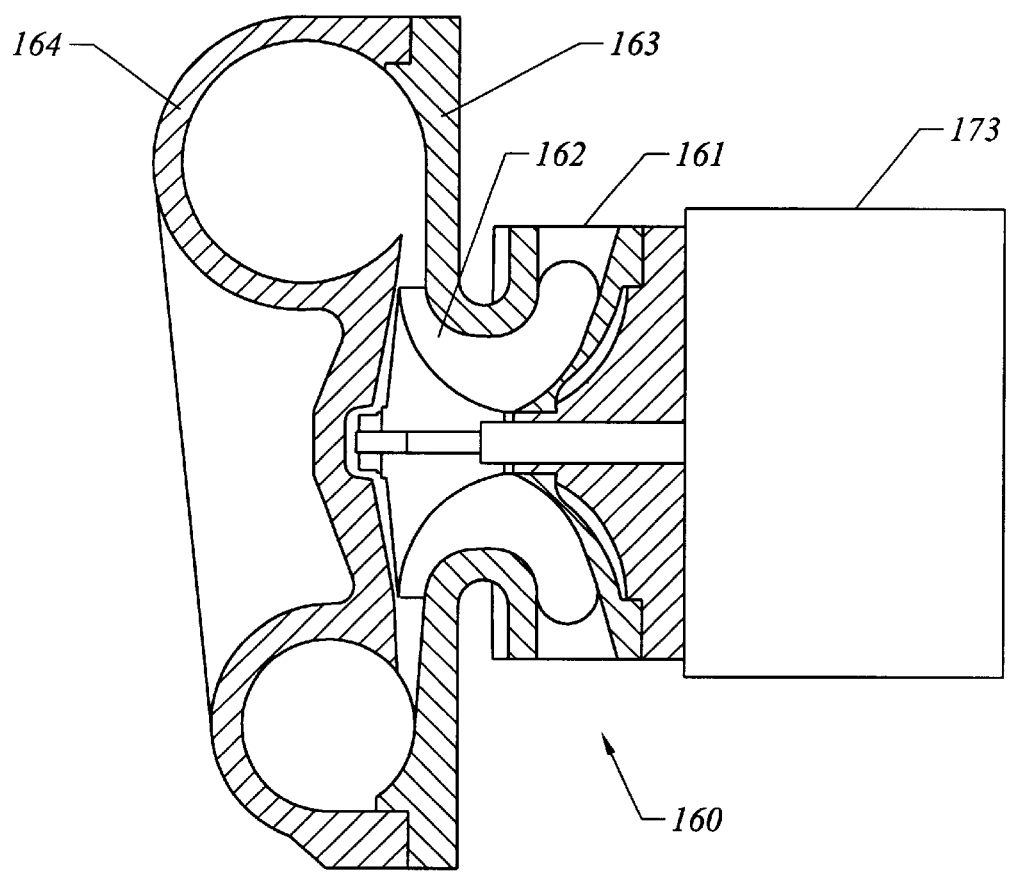
FIG. 4 is a detailed schematic of the electro compressor with an intake side driving shaft.

In FIG. 4 the electric motor driven compressor 160 is shown provided with a housing 164, an intake port 161, a central rotor 162, and an intake housing 163. the central rotor 162 is connected with the electric motor-generator machine 173, which is an electric starter drive and, during operation, an electric generator, for the excess power produced by the counter rotating turbine 110.

Figure 5:
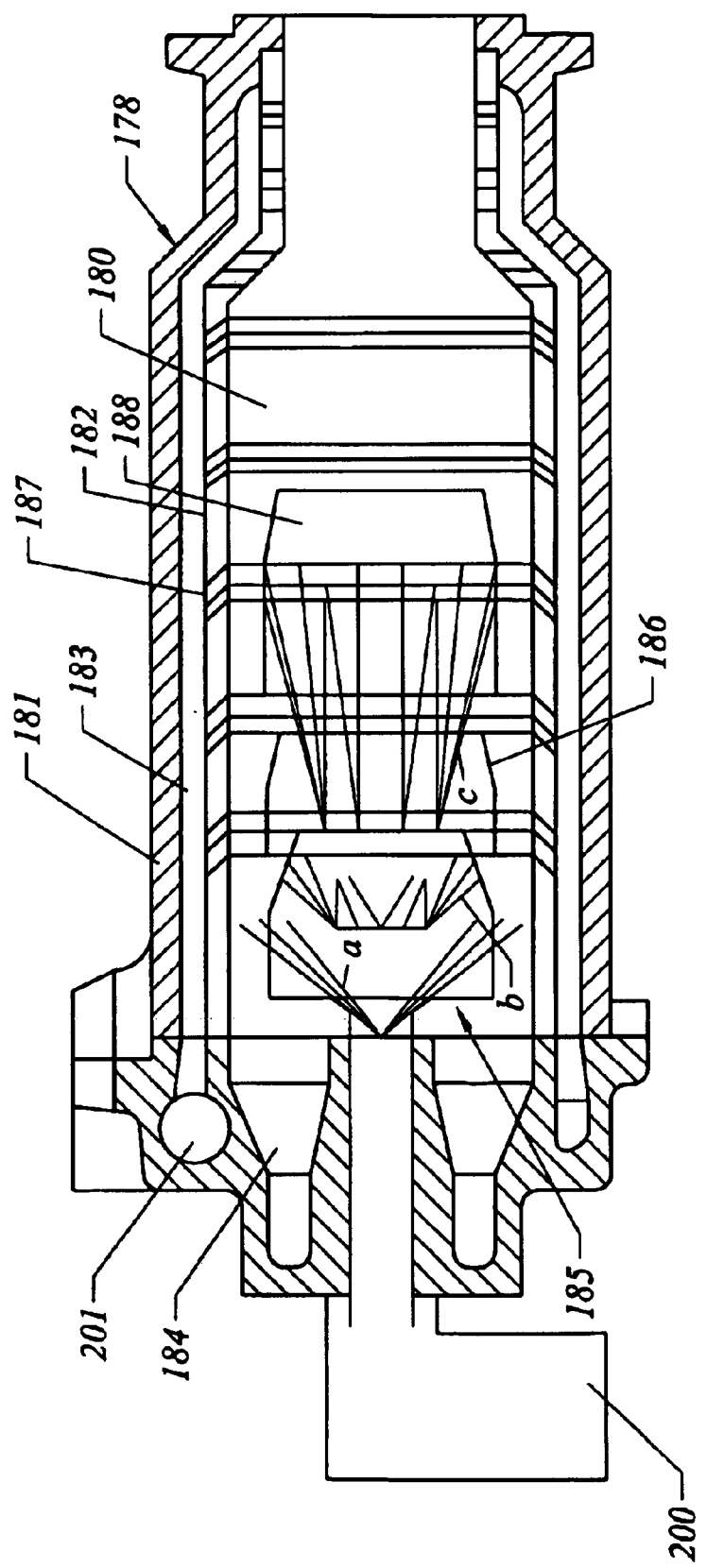
FIG. 5 is a detailed schematic of the ultra high pressure combined steam and combustor, or gas combustor, chamber with a combination chamber having a high frequency pulsatory combustion system.

In FIG. 5 the ultra high pressure combustor 178 is shown. The high pressure combustor 178 has an internal co-generation chamber 180 constructed with an external housing 181, an internal housing 182, a water steam jacket 183 having peripheral-swirl, air induction vanes 184, and pulsatory fuel jet injectors 185, 200, and a high pressure water supply intake 201. The combustion chamber 180 is provided with multiple staged, air-steam deflectors 186 and steam injectors 187. The air-steam injection and deflector passage divide the combustion flame into successive stages, and by fuel injection with high frequency pulsatory fuel injectors 185, 200 staged at a, b and c, the dilution of the combustion gases by air-steam injection allow control of the temperature of the combustion process at any level eliminating NOX formation.

Replacing a conventional dilution by excess air with dilution of steam allows all the compressed air to be used for total combustion at stoichiometric level 15/1, thereby producing a maxim absolute power density of at least four times that of conventional gas turbines.

Figure 6:
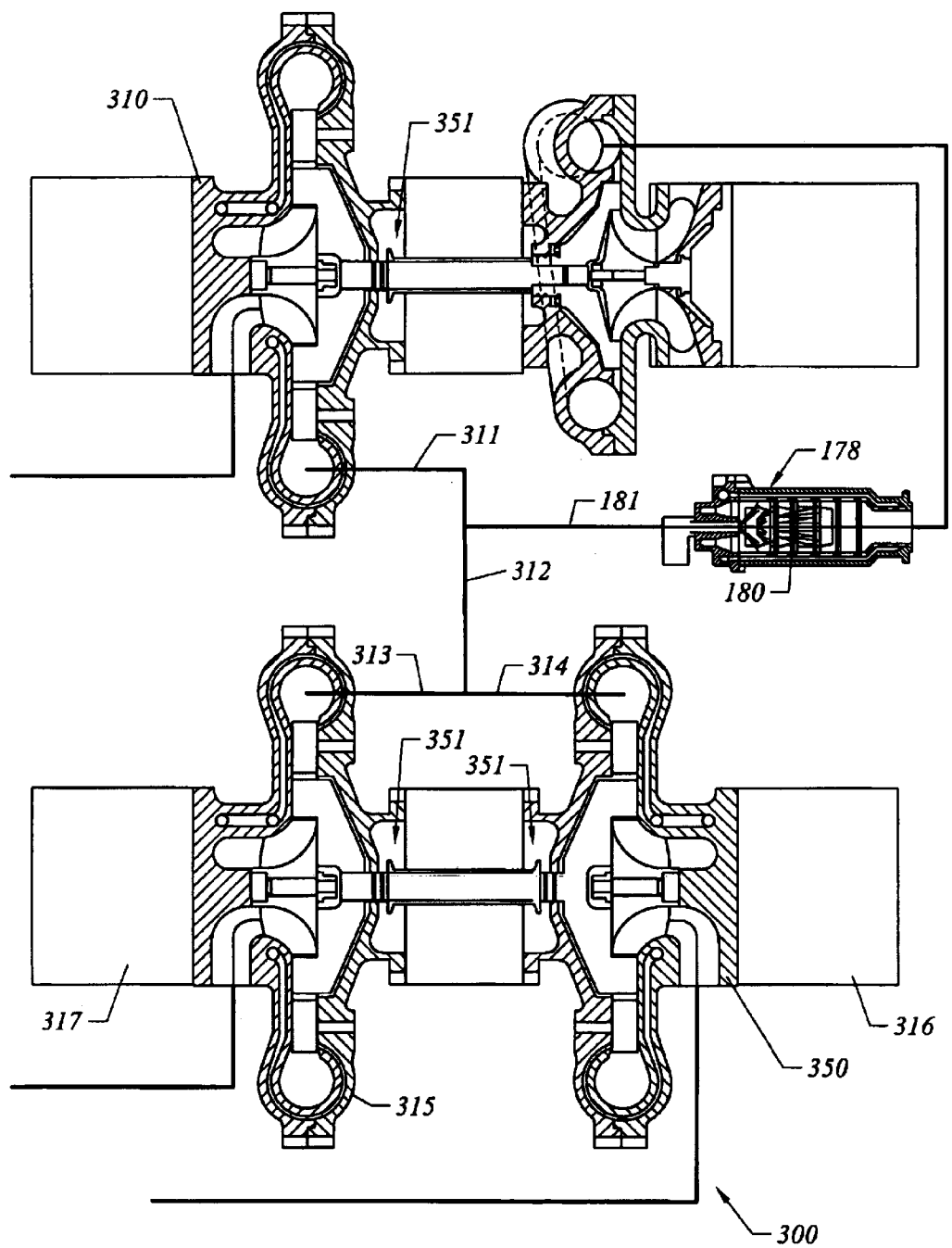
FIG. 6 is a detailed schematic of modular units of total axial balanced turbomachinery.
Figure 7:
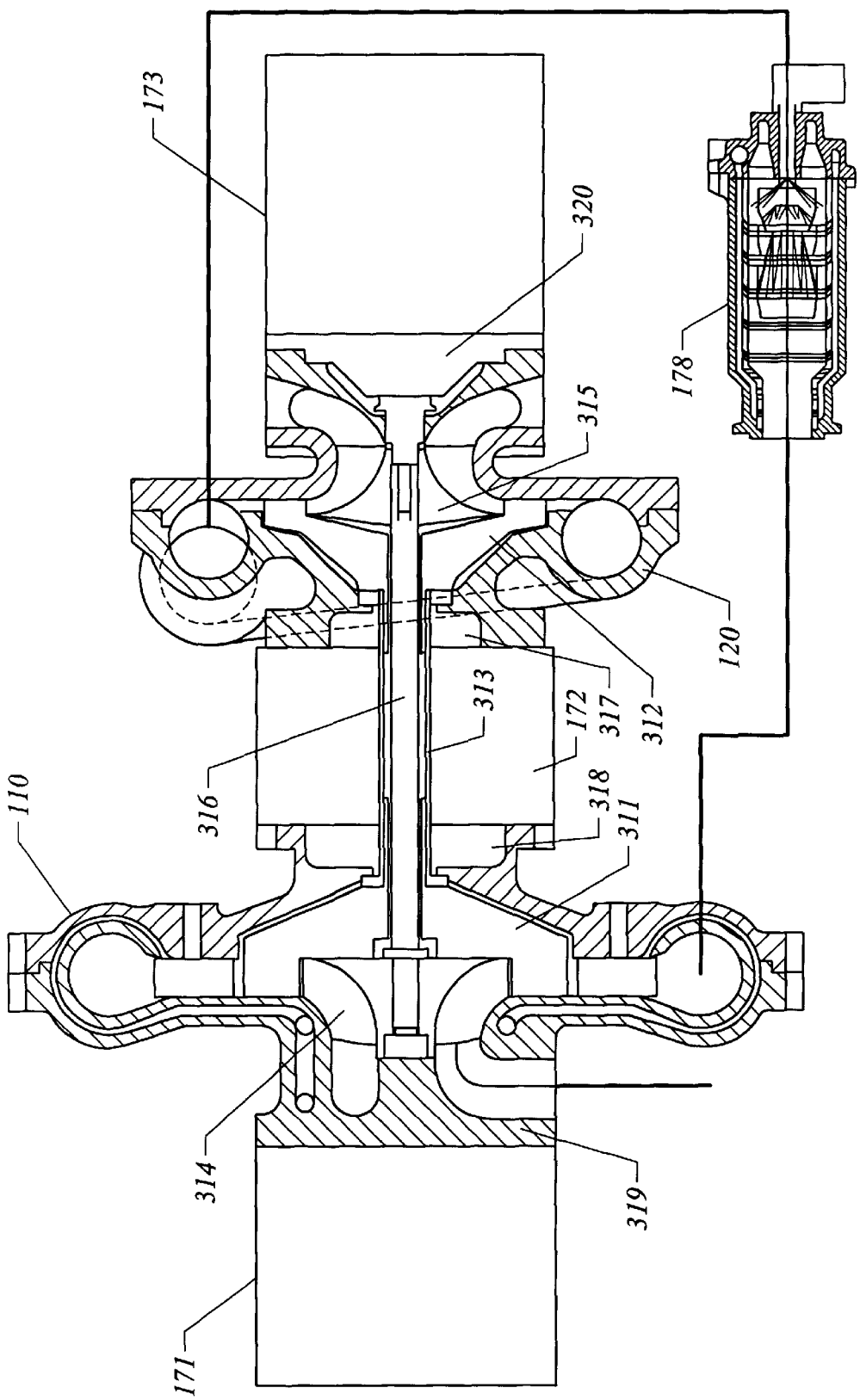
FIG. 7 is a detailed schematic of the gas turbine electric turbo compressor with total axial balance.
Figure 8:
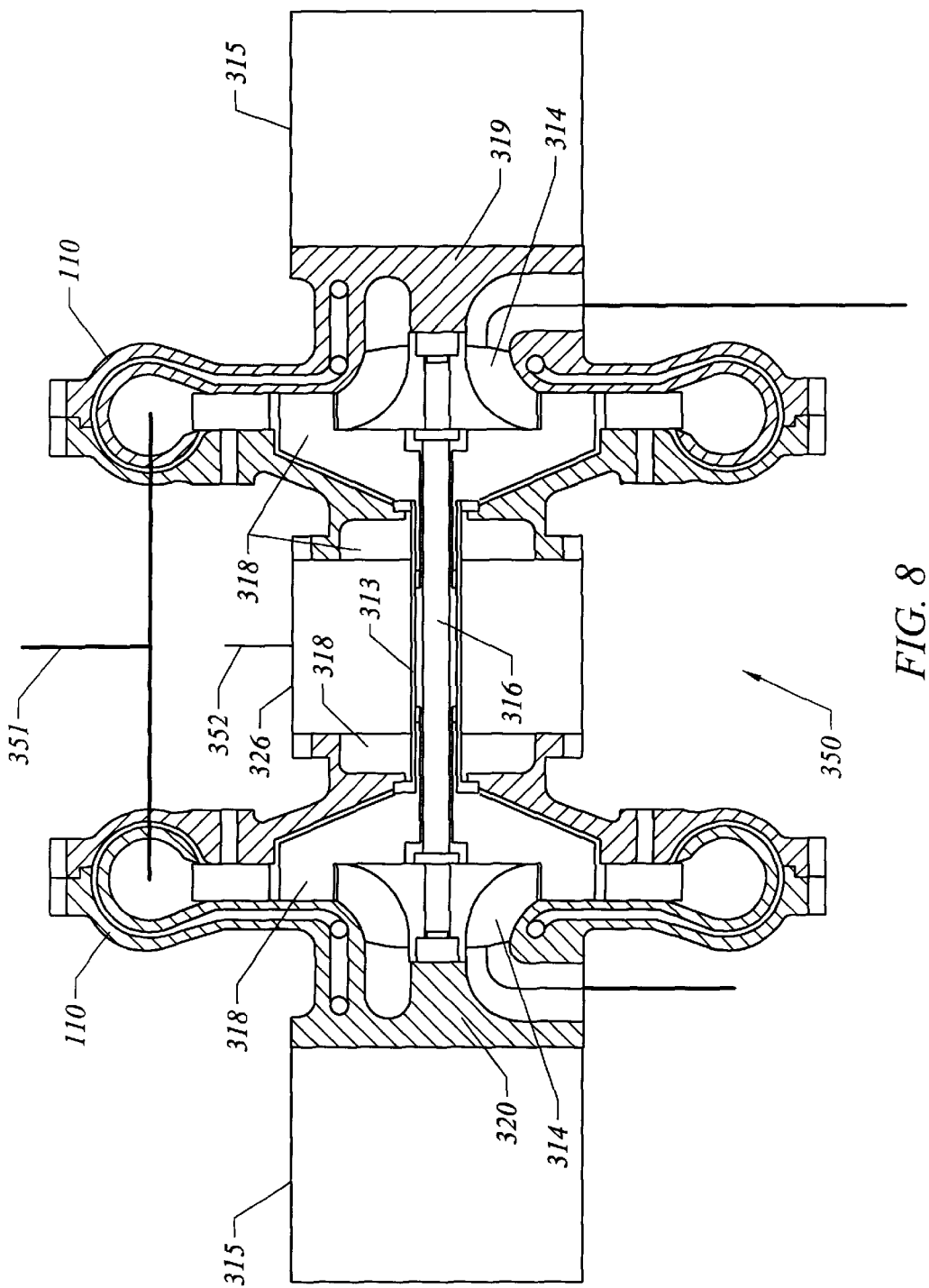
FIG. 8 is a detailed schematic of the turbo electric generator unit with total axial balance.

In FIG. 6 there is depicted a modular gas turbine structure, designated by the generic number 300, constructed with a turbo compressor electric power generator 310, with total axial balanced rotors and air floating bearings, described in detail in FIG. 7, a turbo-turbine electric power generator 350 with total axial balance rotors and air floating bearings, described in detail in FIG. 8 and a combustion chamber 178, described in detail in FIG. 5.

In FIG. 7 the turbo electric compressor generator 310 is shown in greater detail. The turbo electric compressor generator 310 is provided with a counter rotating peripheral turbine rotor 311 interconnected with the counter rotating peripheral compressor rotor 312 by the spool shaft 313. A central turbine rotor 314 is interconnected with the central compressor rotor 315 by a central shaft 316. The peripheral turbine rotor 311 and the peripheral compressor rotor 312 rotate counter to the rotation of the central turbine rotor 314 and the central compressor rotor 315, respectively, electric motor-generator machine 172 is suspended by the air bearing 317, 318, 319 and 320 which are also included in the electric motor-generator machines 171 and 173. All of the rotary components of the counter rotating turbo compressor generator 310 have axial forces balanced. The operation of the gas turbine group is described with reference to the operation of the components in FIGS. 2, 3 and 4, and have the specific characteristic of total axial balance.

In FIG. 8, the counter rotating, symmetric double turbine unit 350 have combined turbine components 110 similar to the compressor generator 110 in FIG. 7. The double turbine unit 350 has a specific common working gas supply 351 distributed symmetrically to both high pressure turbines 110 in a mirror arrangement. The components are described in detail in FIGS. 2 and 3 and are provided with a pressurized compressed air supply 352 of pressure equal to or greater than the pressure of the combusted gases for cooling the electric motor-generator machine 326 and for balancing the axial forces.

The combined modular gas turbine depicted in FIG. 6 works at a permanent constant pressure that is created and maintained constant, independent of any loads by the independent work of the group of turbo electric compressor generators depicted in FIG. 7. The full and partial loads of operation are satisfied solely by the turbo-turbine electric generator, depicted in FIG. 8, which operates independently from the turbo electric compressor generator. The result is a constant pressure cycle, with maximum efficiency and minimum specific fuel consumption throughout the entire practical range of operation.

Figure 9:
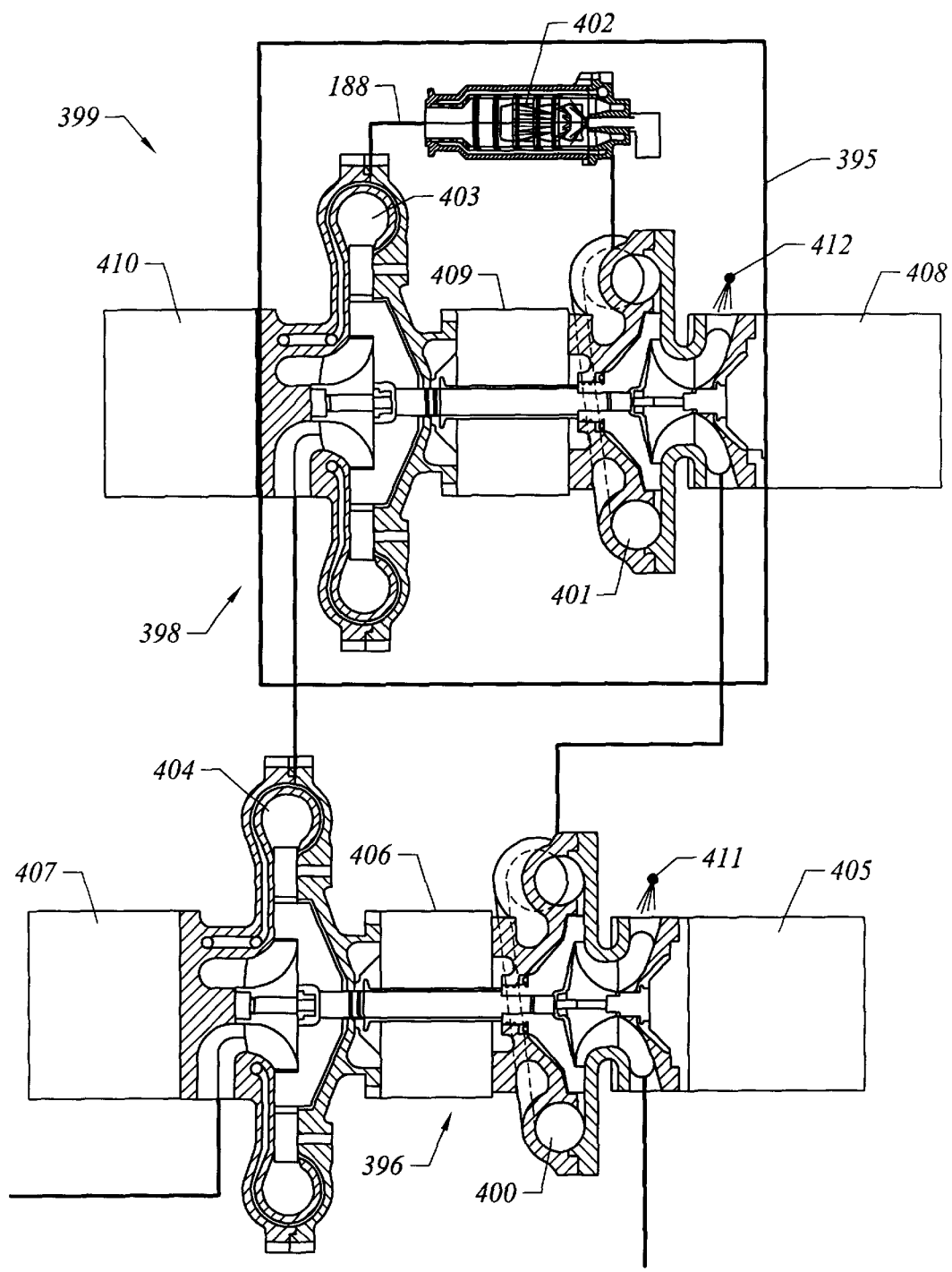
FIG. 9 is a detailed schematic of an alternate turbo electric generator unit with combined turbo electric compressor generator modules.

In FIG. 9, a high efficiency gas power generator system 399 is shown with a unit comprised of two gas turbine power generator modules 396 and 398 of the type described with reference to FIG. 2 in an arrangement that provides for an ultra high pressure turbo electric generator unit for use with an ultra high pressure combustor for maximized efficiency. In the system of FIG. 9, the modules 396 and 398 are staged to generate the ultra high pressure air flow necessary to match the ultra high pressures of the combustor.

In the preferred embodiment shown in FIG. 9, a first turbo electric compressor generator module 396 includes a counter-rotating compressor 400 with a first stage compression ratio of 10–16/1. The high pressure compressed air is supplied to a counter-rotating compressor 401 of the second turbo electric compressor generator module 398 with the same compression ratio for raising the ultra high pressure compression with a total pressure ratio of over 100/1.

For improving the compression efficiency at the high level compression, and for controlling the temperature of the supplied air stream the compressors 400 and 401 each include a water spray injector 411 and 412 for injecting a fine spray of water into the air stream to produce a high pressure cooled wet air flow to the ultra high pressure combustor 402.

In the preferred embodiment, the combustor 402 is of the type described and arranged with reference to FIG. 5. However, it is to be understood that other ultra high pressure combustors can be employed in the system described. In the ultra high pressure combustor 402 a combined combustion gas and superheated steam working fluid is generated and from the transfer pipe 188 is expanded in the ultra high pressure counter-rotating turbine 403 as a first stage expansion in the second module 398 and subsequently piped to the high pressure counter-rotating turbine 404 for the final stage of expansion in the first module 396. The counter-rotating shafts drive electric motor generators 405, 406, 407, 408, 409 and 410.

The turbo electric compressor generator modules 396 and 398 are totally balanced compressor and turbine combinations associated in a staged arrangement for the maximum absolute thermal efficiency for gas turbine technologies. In a preferred embodiment, the higher pressure module 398 is encapsulated in an enclosure 395 which is pressurized by air at the same maximum pressure of the cycle thereby eliminating all of the mechanical stresses of the ultra high pressure stage of the module 398.

Figure 10:
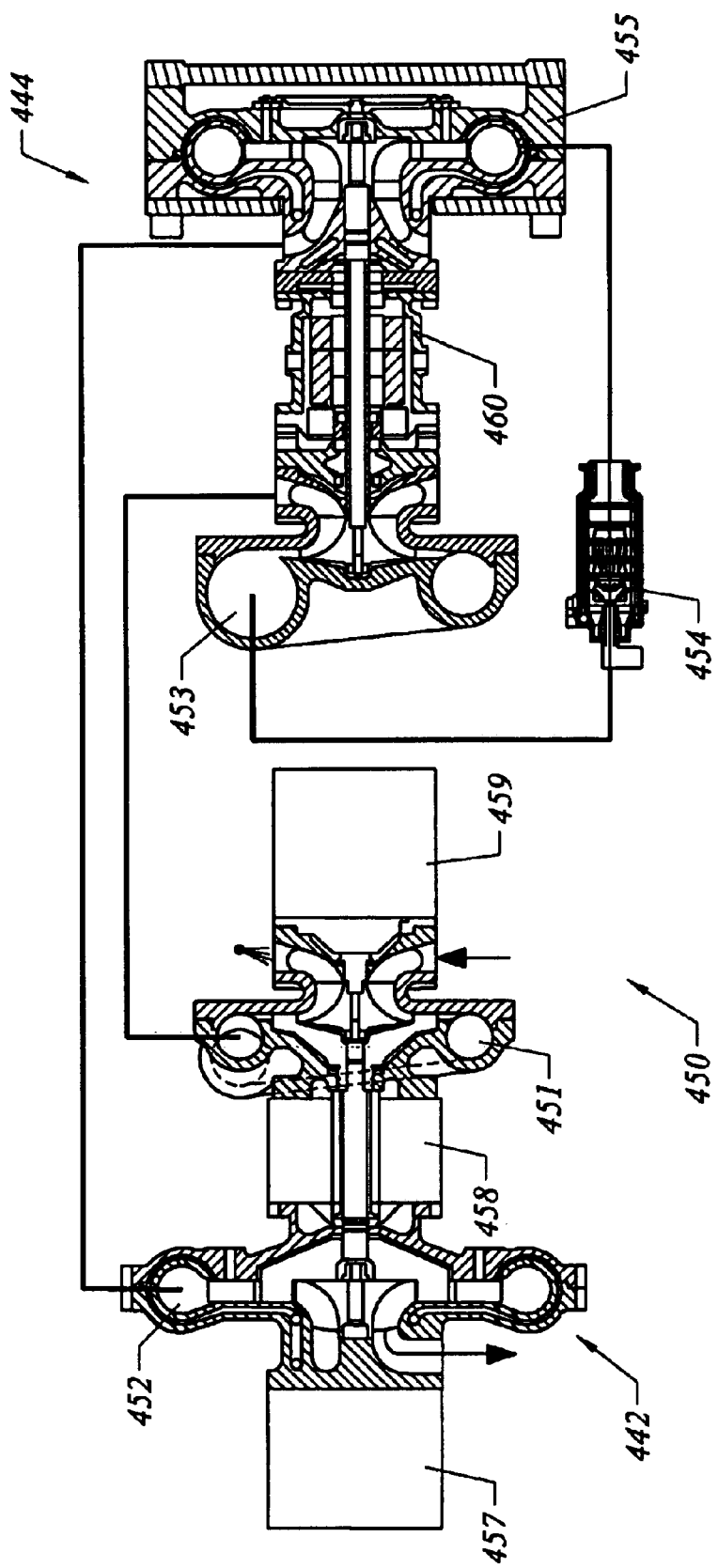
FIG. 10 is a detailed schematic of an alternate turbo electric generator unit with alternate combined turbo electric compressor generator modules.

In FIG. 10, an alternate embodiment of an ultra high pressure turbine unit 440 is shown with a high pressure turbo electric compressor generator module 442 operably connected to an ultra high pressure turbo electric compressor generator module 444. The alternate ultra high pressure turbine unit 440 includes a counter-rotating compressor 451 and counter-rotating turbine 452 of module 442 operably connected to a final stage compressor 453 for supplying compressed air and water vapor to an ultra high pressure combustor 454 which supplies the combustion and superheated steam gases to the ultra high pressure first stage turbine 455 that exhausts to the final stage counter-rotating turbine 452. The shafts, as described with reference to previous embodiments, drive motor generators 457, 458, 459 and 460.

Figure 11:
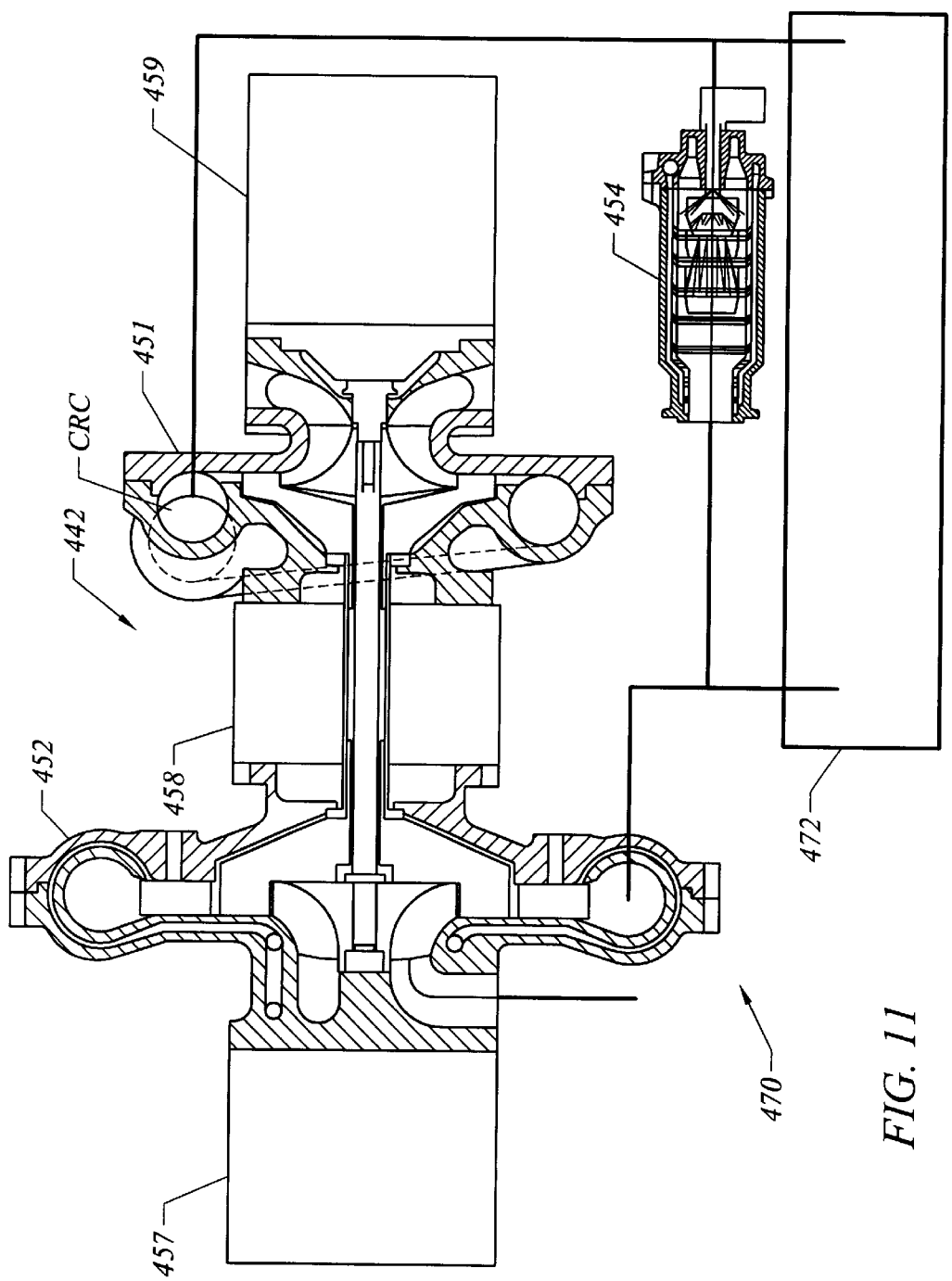
FIG. 11 is a detailed schematic, partially diagrammatic, of an alternate turbo electric generator unit with a combined turbo electric compressor generator and high pressure diesel engine.

In FIG. 11, an alternate high efficiency gas power generation system 470 is shown with the turbo electric compressor generator module 442 having a counter-rotating compressor 451 and counter-rotating turbine 452 selectively combined with the combustor 454 and a high pressure diesel engine 472. The high pressure diesel engine 472 is shown schematically and may preferably comprise an opposed piston engine as described in U.S. Pat. No. 5,042,441 issued Aug. 27, 1991, entitled "Low Emission Combustion System For Internal Combustion Engines." Electrical power is generated by the drive motor generators 457, 458 and 459. The alternate high efficiency gas power generator system 470 of FIG. 11 has three modes of operation. In a first mode of operation, the system 470 can be operated as a gas turbine power generator alone using the combustor 454 as the sole source of working heat, or in a second mode in combination with the exhaust of the high pressure diesel engine 472. In a third mode of operation, the ultra high pressure diesel engine 472 can be operated alone with the turbo electric compressor generator module 442 operating as a turbo charger for the engine 472.

In the first mode of operation, the counter-rotating compressor 451 supplies wet compressed air to the combustor 454 which in turn supplies the hot gas and super heated steam to the counter-rotating gas turbine 452. In a second mode of operation, both the combustor 454 and the diesel engine 472 are supplied with compressed air from the counter-rotating compressor 451 and the combined exhaust stream from the combustor 454 and engine 472 are supplied to the counter-rotating turbine 452. In the third mode of operation, the diesel engine 472 alone supplies high pressure exhaust gases to the counter-rotating turbine 452 which drives the compressor 451 for supplying compressed air to the diesel engine 472. Electrical power is extracted from the motor generators 457, 458 and 459.

Figure 12:
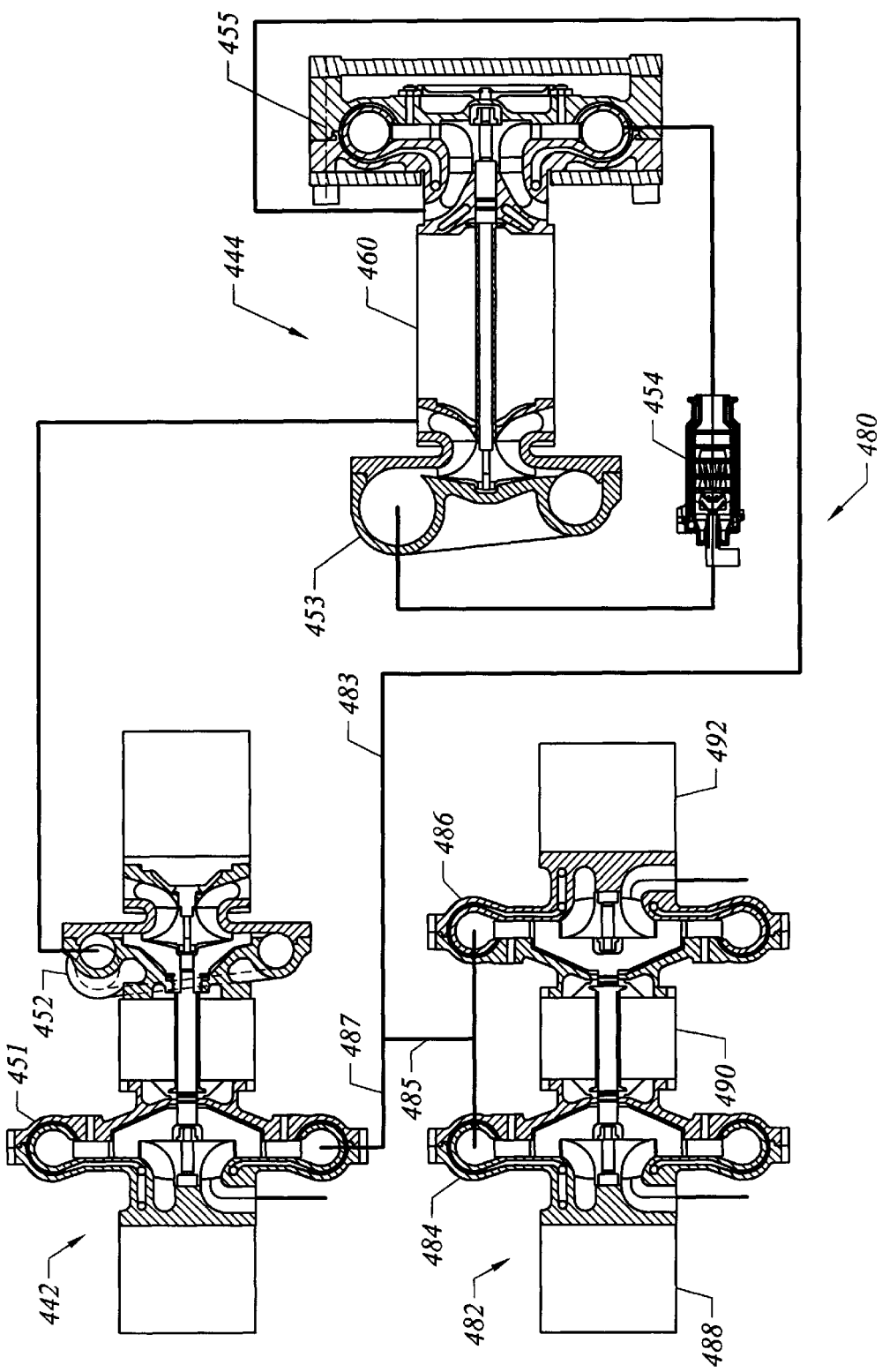
FIG. 12 is a detailed schematic of an alternate turbo electric generator unit with multiple combined turbo electric compressor generator modules.

In FIG. 12, an ultra high efficiency gas power generator system 480 is formed by a novel arrangement of previously described components to maximize the efficiency and minimize the specific fuel consumption of a variable demand system. In FIG. 12, a turbo electric compressor generator module 442 is combined with an ultra high pressure turbo electric compressor generator module 444 and combustor 454 as in FIG. 10. The generator system 480 also includes a double counter-rotating turbine module 482 comprising counter-rotating turbines 484 and 486 with interconnected motor generators 488, 490 and 492. In this embodiment, counter-rotating compressor 452 compresses air at a first stage and delivers the compressed air to second stage compressor 453. The highly compressed air is then discharged to combustor 454 where the combustion and super heated steam gases drive high pressured counter-rotating turbine 455. After a first stage expansion of approximately 4/1, the motive gas is passed through conduit 483 and distributed through conduit 485 to the double counter-rotating turbine module 482 and through conduit 487 to the counter-rotating turbine 451 of the module 442. The three turbine components provide the final expansion of the motive gas. This arrangement of modules creates the ability to maintain a constant pressure ratio by satisfying the turbo compressor modules 442 and 444 with a constant energy and supplying the double counter-rotating turbine module 482 at a variable load as required by power demand. The result provides a constant maximum efficiency at a constant minimum fuel consumption.

Figure 13:
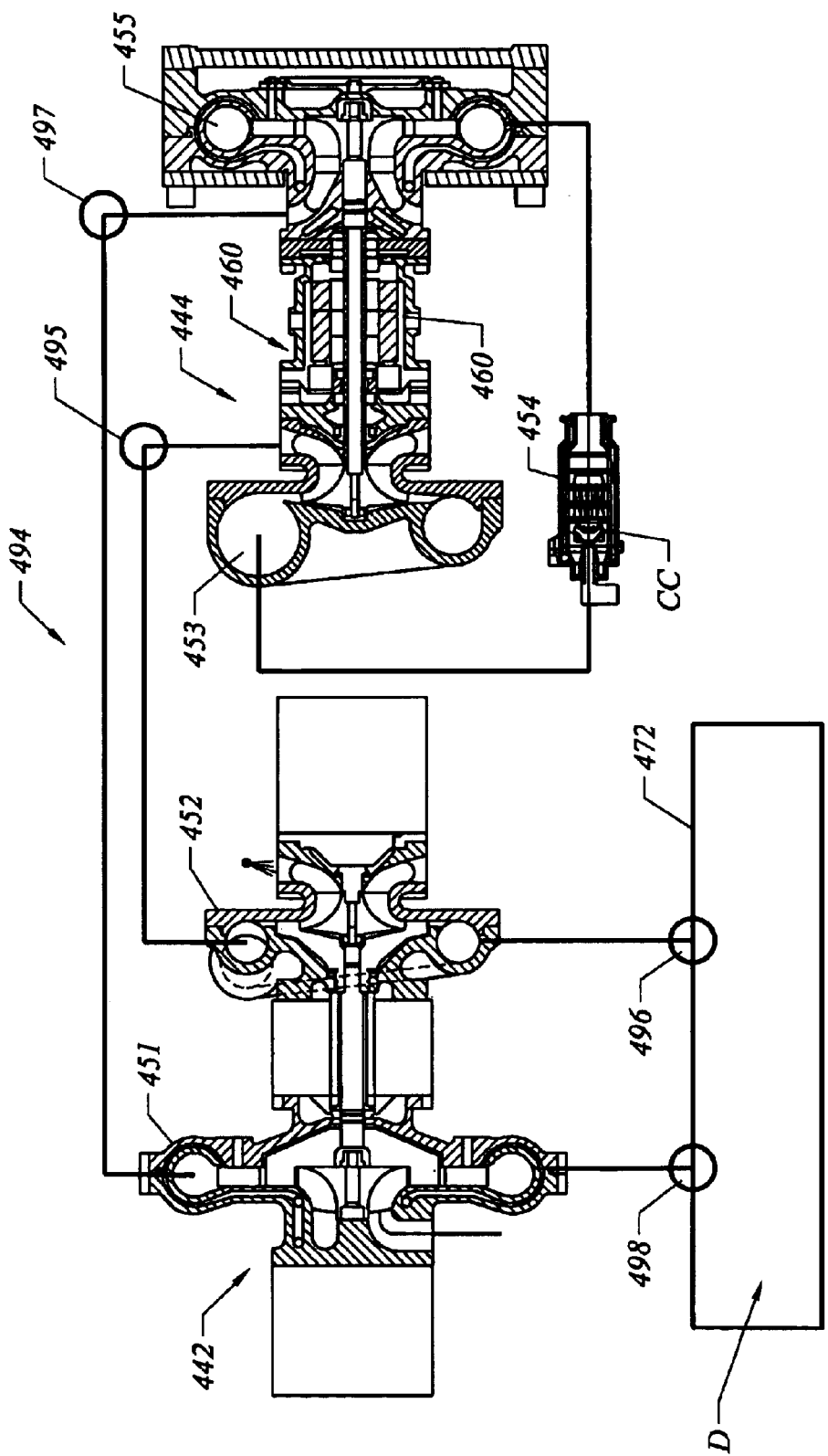
FIG. 13 is a detailed schematic of an alternate turbo electric generator unit with multiple turbo electric compressor generator modules and a high pressure diesel engine.

In FIG. 13, an alternate embodiment of a high efficiency gas power generator system 494 is shown with a low pressure turbo electric compressor generator module 442 and a high pressure turbo electric compressor generator module 444 in combination with a high pressure combustor 454 and a diesel engine 472. In the parallel diesel and gas turbine arrangement, first stage compression at a 10/1 a pressure ratio of counter-rotating compressor 452 supplies both the diesel engine, 472 and the second stage compressor 453 through regulated gas connections 495 and 496. After second stage compression for a final pressure ratio of 40–60/1, the air and water vapor mixture is supplied to the high pressure combustor 454 with the high pressure motive gas of combustion gas and steam exhausted to the first stage turbine 455 and to the second stage counter-rotating turbine 451 through connector 497 where it is combined with gases exhausted from the diesel engine 472 through connector 498. In the system of FIG. 13, both the combustor 454 and diesel engine 472 can operate separately or in parallel for a super power regime.

Figure 14:
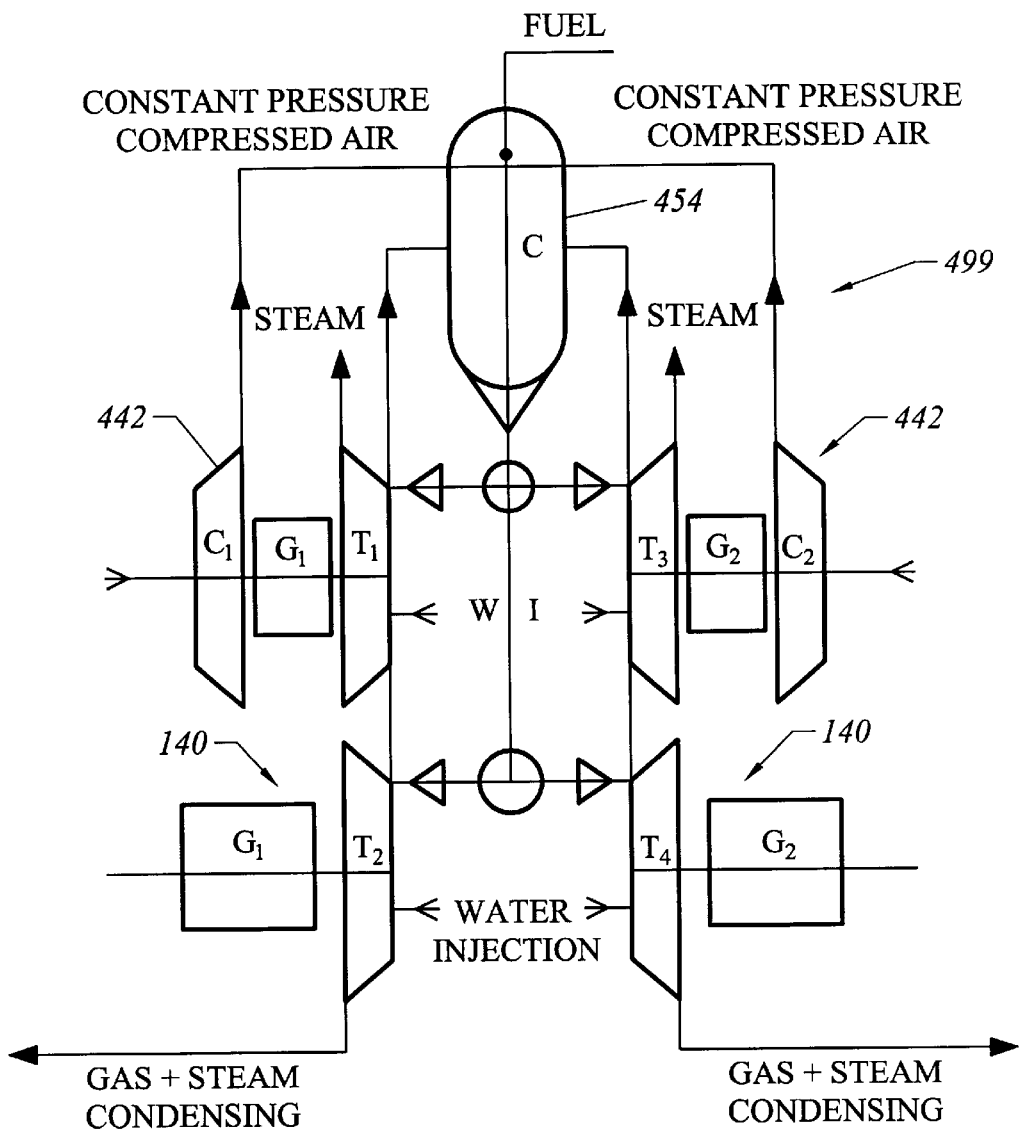
FIG. 14 is a diagrammatic schematic of an alternate turbo electric generator unit with parallel turbo electric compressor generator modules.

In FIG. 14, a schematic diagram of an alternate high efficiency gas power generation system 499 is shown with a single combustor 454 connected with a pair of parallel turbo electric compressor generator modules 442 in combination with a pair of parallel, one stage, gas turbines 140 of the type disclosed with reference to FIG. 3. The system is arranged for parallel expansion and independent constant compression at all regimes of power and variable loads providing a constant thermal efficiency and constant specific fuel consumption. Both motive gas turbine branches are able to provide for a very large power regime and load variation with excellent conservation of the maximum efficiency at all regimes of operation.

By use of the combined internal co-generation cycle using water injection in the compressors, gas turbines and combustion chamber, at least a four times larger power density can be generated than conventional thermal cycles for turbine systems.

Figure 15:
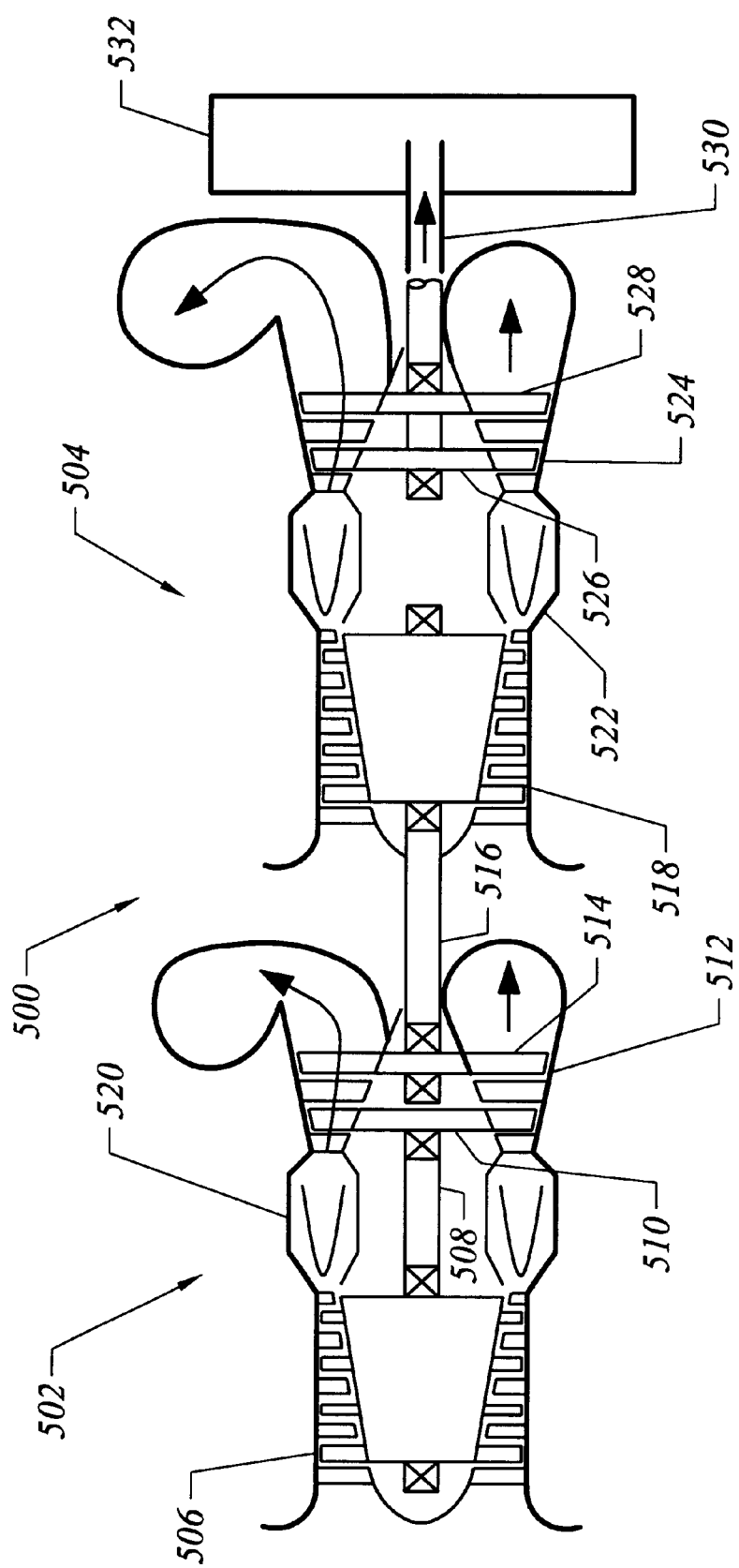
FIG. 15 is a detailed schematic of an alternate turbo electric generator unit with a combination of multiple integrated gas turbines in a power generation cascade.

In FIG. 15, a gas power generator system 500 is shown with a combination of conventional turbo compressor units 502 and 504 combined in an energy cascade by a novel integration of the components. In the first turbo compressor unit 502, a compressor component 506 has a shaft 508 connected to a first stage turbine rotor 510 of the turbine component 512 of the turbo compressor 502. A second stage turbine rotor 514 of the turbine component 512 of turbo compressor unit 502 has a shaft 516 connected to the compressor 518 of the second turbo compressor unit 504. Combustion in the burner 520 of the turbo compressor unit 502 generates the power to drive both compressors 506 and 518. In this manner, the burner 522 of the second turbo compressor unit 504 generates the combustion gases for driving the entire turbine component 524 with all of the output from the first and second stage turbine rotors 526 and 528 of the turbine component 524 delivered to the common output shaft 530 for operating the electrical power generator 532. The first turbo compressor unit 502 can be operated at a constant rotation for generating a compressed air pressure that is also maintained constant. Variations in power demand is satisfied by a variation in the fuel supply burned in the burner 522 allowing a conservation of the maximum thermal efficiency at all loads with minimum specific fuel consumption.

Figure 16:
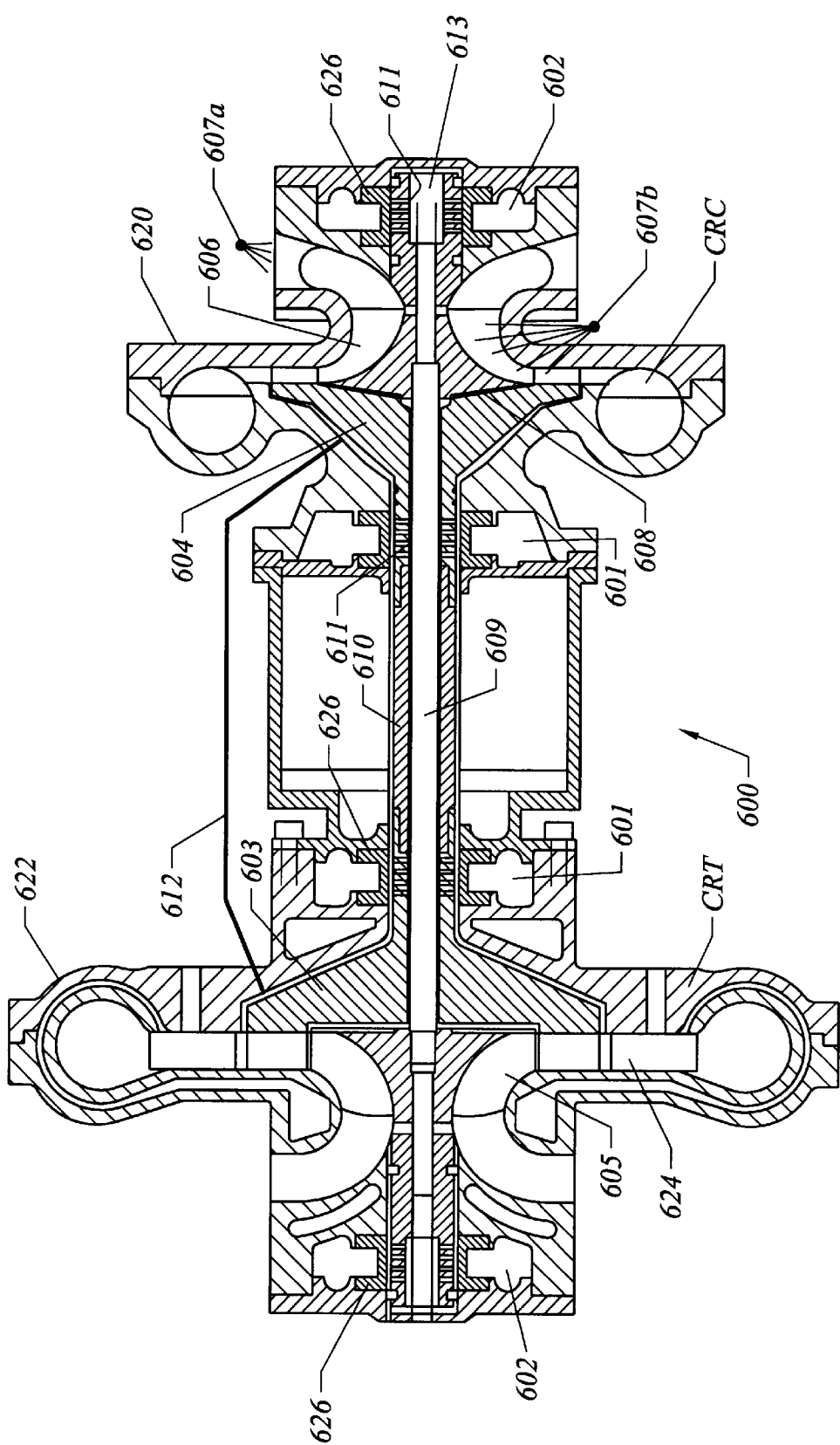
FIG. 16 is a cross-sectional view of a high pressure turbocharger module showing air assisted foil bearings for preferred use in all turbo electric generator modules.

In FIG. 16 a cross-sectional view of a high pressure, counter-rotating turbo charger unit 600 is shown to illustrate a preferred air bearing system for floating the rotors of the counter-rotating turbine and compressor components of the unit. This air bearing system can be applied to the various embodiments of the modules and units previously disclosed.

In FIG. 16, the high pressure turbo charger 600 has a counter-rotating compressor 620 connected to a counter-rotating turbine 622 by common shaft 609 and oppositely rotating concentric hollow shaft 610. The counter-rotating turbine 622 is provided with variable geometry vanes 624 which are also preferred for use in the previous embodiments described for tuning the systems. The air assisted foil bearings 626 are seated in central compartments 601 and end compartments 602. The central turbine rotor 605 and central compressor rotor 606 are interconnected on common shaft 609 which is suspended on a compressed wet air cushion from air assisted foil bearings 626 at each end of the unit. Peripheral rotors 603 and 604 are interconnected by a common hollow shaft 610 that is concentric to shaft 609. The shaft 610 is suspended by air assisted foil bearings 626 at compartments 601. The air assisted foil bearings 626 include very small injection holes 611 in the shafts 609 and 610 opposite the foil bearings. With water spray injection at the: entry of the compressor through injector 607a and with water spray injection internal to the compressor at 607b, a cooling is provided that reduces the value of the polytropic exponent from $n_p=2-2.5$ to $n_p=1.1-1.2$. This produces a great reduction in the compressor work and eliminates the need for an intercooler between the stages of air compression. The water vapor and any generated steam is mixed with the air and supplied to the pressurized chambers 601 and 602. The pressurized mixture provides for lubrication and cooling while floating the counter-rotating shafts 609 and 610 during operation. In addition to balancing all of the axial forces in the counter-rotating assembly, the compressed wet air injected between the shafts 609 and 610 and the bearings 626 inhibits leakage. Preferably, the high pressure compressed wet air is injected through fluid lines 612 directed behind the compressor rotor 604 and behind the turbine rotor 603 and hence through the small holes 611 opposite the air assisted foil bearings 626 at compartments 601. Similarly, air is injected at the ends of the unit through air lines 613 and through holes 611 opposite the air assisted foil bearings 626 at compartments 602.

Figure 17:
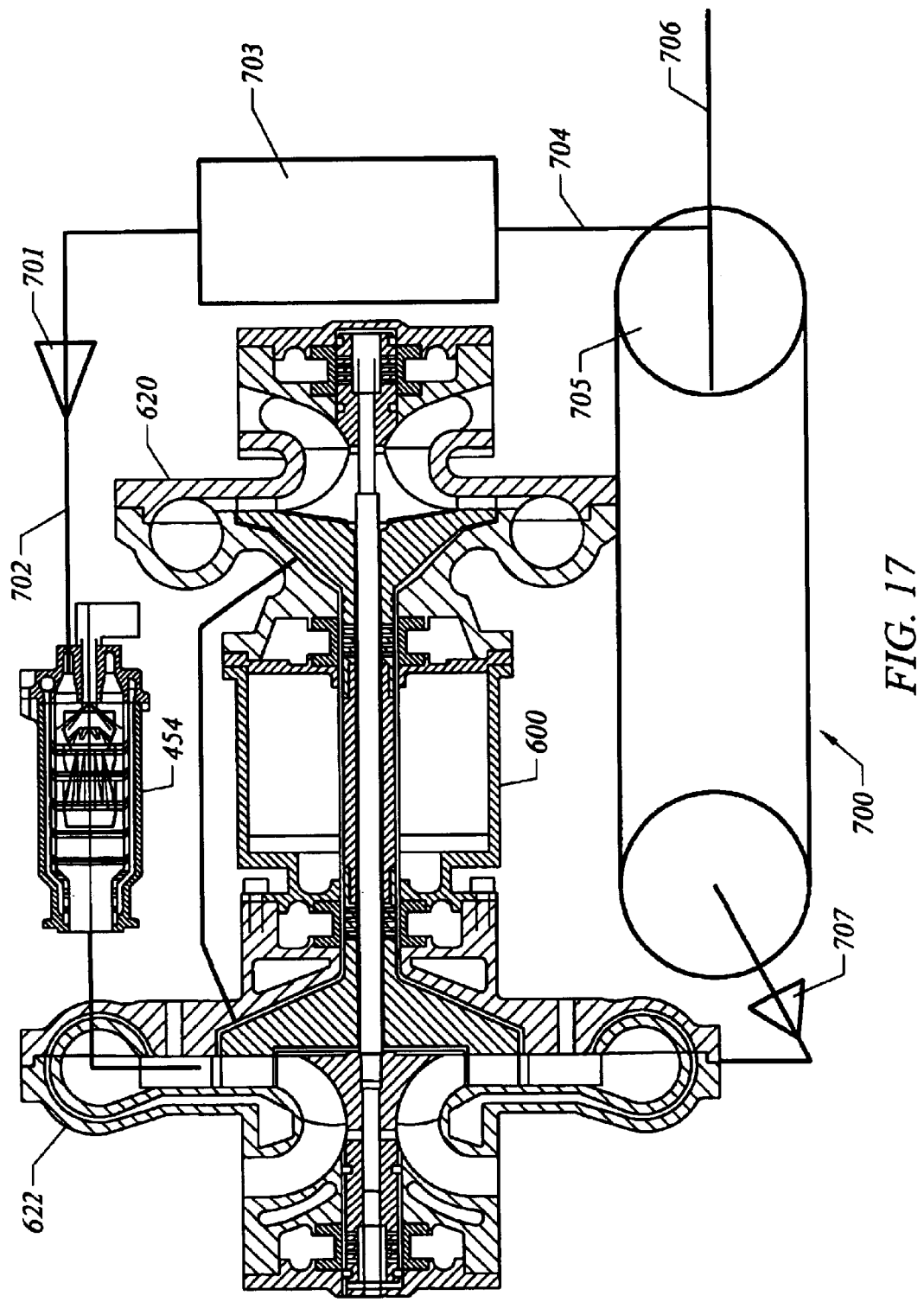
FIG. 17 is a detailed schematic of the high pressure turbocharger module in a compressed air storage system.

In FIG. 17, the high pressure turbo charger unit 600 of FIG. 16 is incorporated into a high efficiency gas generator system 700 that includes a compressed air receiver tank 705 for use in industrial applications and other applications where storage of compressed air is desired. The system 700 includes a combustor 454 that is supplied compressed air from counter-rotating compressor 620 and alternately or concurrently supplied by the receiver tank 605 through intercooler 703 as regulated by control valve 701. The compressed air receiver tank 705 stores excess compressed air for external use through line 706. Stored compressed air in the storage tank 705 also provides the compressed air to the counter-rotating turbine 622 through control valve 707 during startup.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A high efficiency gas turbine power generator comprising:
   an ultra high pressure combustor having a gas intake, an internal cogeneration chamber with fuel injection, steam injection and a motive gas transfer pipe;
   a first turbo electric compressor generator module having:
      a counter-rotating electric motor driven high pressure compressor for first stage air compression; and
      a counter-rotating high pressure turbine for second stage motive gas expansion with counter-rotating shafts connecting the counter-rotating compressor and counter-rotating turbine;
   a second turbo electric compressor generator module having:
      a counter-rotating electric motor driven ultra high pressure compressor for second stage air compression, and
      a counter-rotating ultra high pressure turbine for first stage motive gas expansion with counter-rotating shafts connecting the counter-rotating compressor and counter-rotating turbine; and
   at least one motor generator connected to one of the counter-rotating shafts;
      wherein the counter-rotating compressor of the first module is staged with the counter-rotating compressor of the second module and the counter-rotating turbine of the first module is staged with the counter-rotating turbine of the second module for maximized compression and expansion ratios.

2. The high efficiency gas turbine power generator of claim 1 wherein the motor generator is located between the counter-rotating high pressure compressor and counter-rotating high pressure turbine of the first turbo electric compressor generator module.

3. The high efficiency gas turbine power generator system of claim 2 wherein a second motor generator is located at one end of the first turbo electric compressor generator module and a third motor generator is located a the other end of the first turbo electric compressor generator module with the second and third motor generators being connected to one of the counter-rotating shafts and the motor generator located between the counter-rotating high pressure compressor and counter-rotating high pressure turbine being connected to the other of the counter-rotating shafts.

4. The high efficiency gas turbine power generator of claim 3 a fourth motor generator is located between the counter-rotating ultra high pressure compressor and counter-rotating ultra high pressure turbine and connected to one of the counter-rotating shafts of the second turbo electric compressor generator module.

5. The high efficiency gas turbine power generator of claim 4 wherein a fifth motor generator is located at one end of the second turbo electric compressor generator module and a sixth motor generator is located at the other end of the second turbo electric compressor generator module with the fifth and sixth motor generators being connected to the other counter-rotating shafts of the second turbo electric compressor generator module.

6. The high efficiency gas turbine power generator of claim 1 wherein further comprising:
   a turbo electric generator module having:
      a first counter-rotating high pressure turbine;
      a second counter-rotating high pressure turbine with counter rotating shafts connected to the first counter-rotating high pressure turbine; and
      at least one motor generator connected to each of the counter-rotating shafts wherein expanded motive gas from the ultra high pressure turbine of the second turbo electric compressor generator module drives the turbo electric generator module.

7. The high efficiency gas turbine power generator system of claim 1 in combination with a diesel engine wherein the diesel engine is supplied high pressure compressed air from the counter-rotating electric motor driven high pressure compressor and supplies exhaust gases to the counter-rotating high pressure turbine of the first turbo electric compressor generator module.

8. The high efficiency gas turbine power generator system of claim 1 including water injection into the compressors of the system for cooling and cogeneration.

9. The high efficiency gas turbine power generator system of claim 1 including water injection into the turbines for cooling and cogeneration.

10. The high efficiency gas turbine power generator system of claim 1 including water injection into the combustor for cooling and cogeneration.

11. The high efficiency gas turbine power generator system of claim 1 in combination with a diesel engine wherein the counter-rotating electric motor driven high pressure compressor supplies compressed air to the diesel engine and the diesel engine discharges combustion gases to the counter-rotating high pressure turbine.

* * * * *